United States Patent
Baird et al.

(10) Patent No.: US 8,621,261 B2
(45) Date of Patent: Dec. 31, 2013

(54) SUPPORT FOR VIRTUALIZED UNIFIED COMMUNICATIONS CLIENTS WHEN HOST SERVER CONNECTIVITY IS LOST

(75) Inventors: Randall Bernard Baird, Austin, TX (US); J. Steven Mayer, LeRoy, NY (US); Joe Smyth, Newcastle (IE)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 12/953,706

(22) Filed: Nov. 24, 2010

(65) Prior Publication Data

US 2012/0131377 A1 May 24, 2012

(51) Int. Cl.
*G06F 11/00* (2006.01)
(52) U.S. Cl.
USPC .......................................................... 714/4.11
(58) Field of Classification Search
USPC ................................................ 714/4.11, 4.1
See application file for complete search history.

(56) References Cited

U.S. PATENT DOCUMENTS

| 7,568,056 | B2 | 7/2009 | Danilak |
| 2006/0104259 | A1 | 5/2006 | Caballero-McCann et al. |
| 2007/0116246 | A1 | 5/2007 | Walker et al. |

OTHER PUBLICATIONS

Cisco, "Cisco Unified Survivable Remote Site Telephony Version", 4.1; 2008 Cisco Systems, Inc. pp. 1-10.

*Primary Examiner* — Yair Leibovich
(74) *Attorney, Agent, or Firm* — Edell, Shapiro & Finnan, LLC

(57) ABSTRACT

Techniques are provided for establishing a Virtual Desktop Interface (VDI) connection at a virtual desktop thin client (VDTC) device, between a VDI client in the VDTC device and a VDI server in a hosted virtual desktop server (HVDS). A unified communications (UC) control connection is established between a UC protocol stack on the VDTC device and a primary call agent, where the UC control connection is configured to allow the UC protocol stack to register with the primary call agent, and to send or receive commands from the primary call agent that are based on signals from a UC control application running on the HVDS. A UC control backup application is started on the virtual desktop thin client device in a standby mode that is configured to switch to an active mode in response to a failure to establish or maintain the UC control connection, or a failure to establish or maintain the VDI connection. A user interface is launched on the virtual desktop thin client device that is configured to perform UC backup functions.

22 Claims, 10 Drawing Sheets

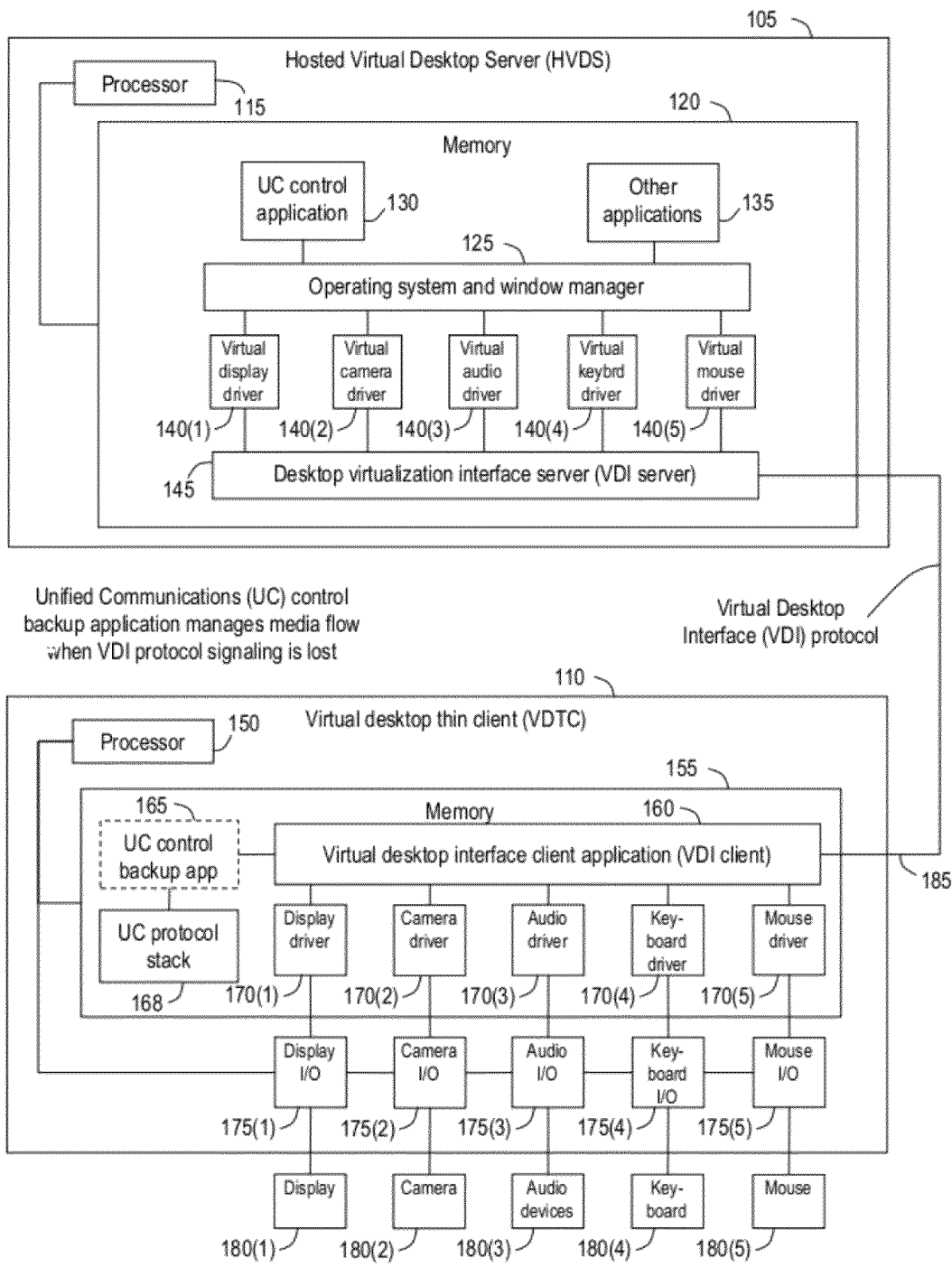

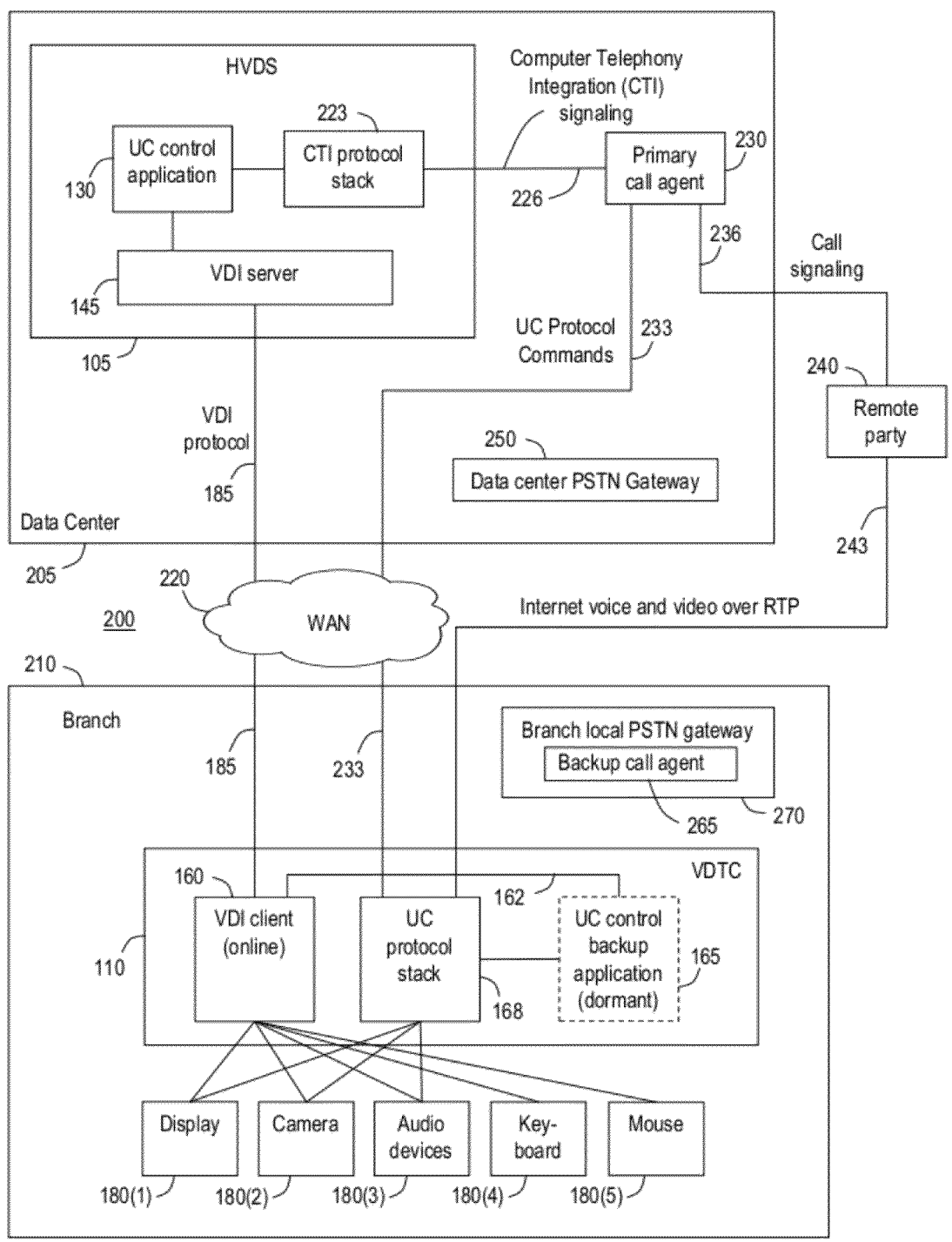

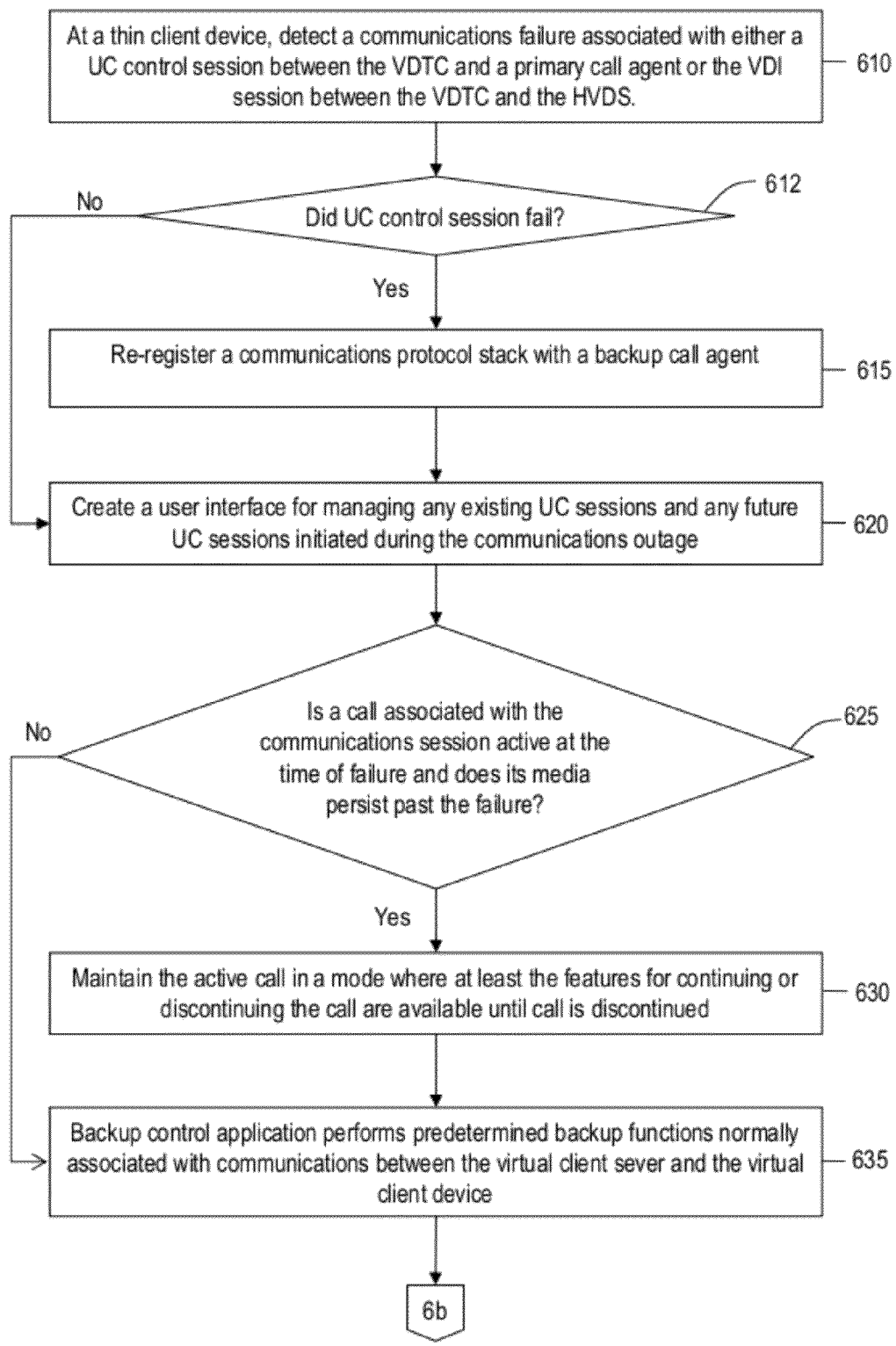

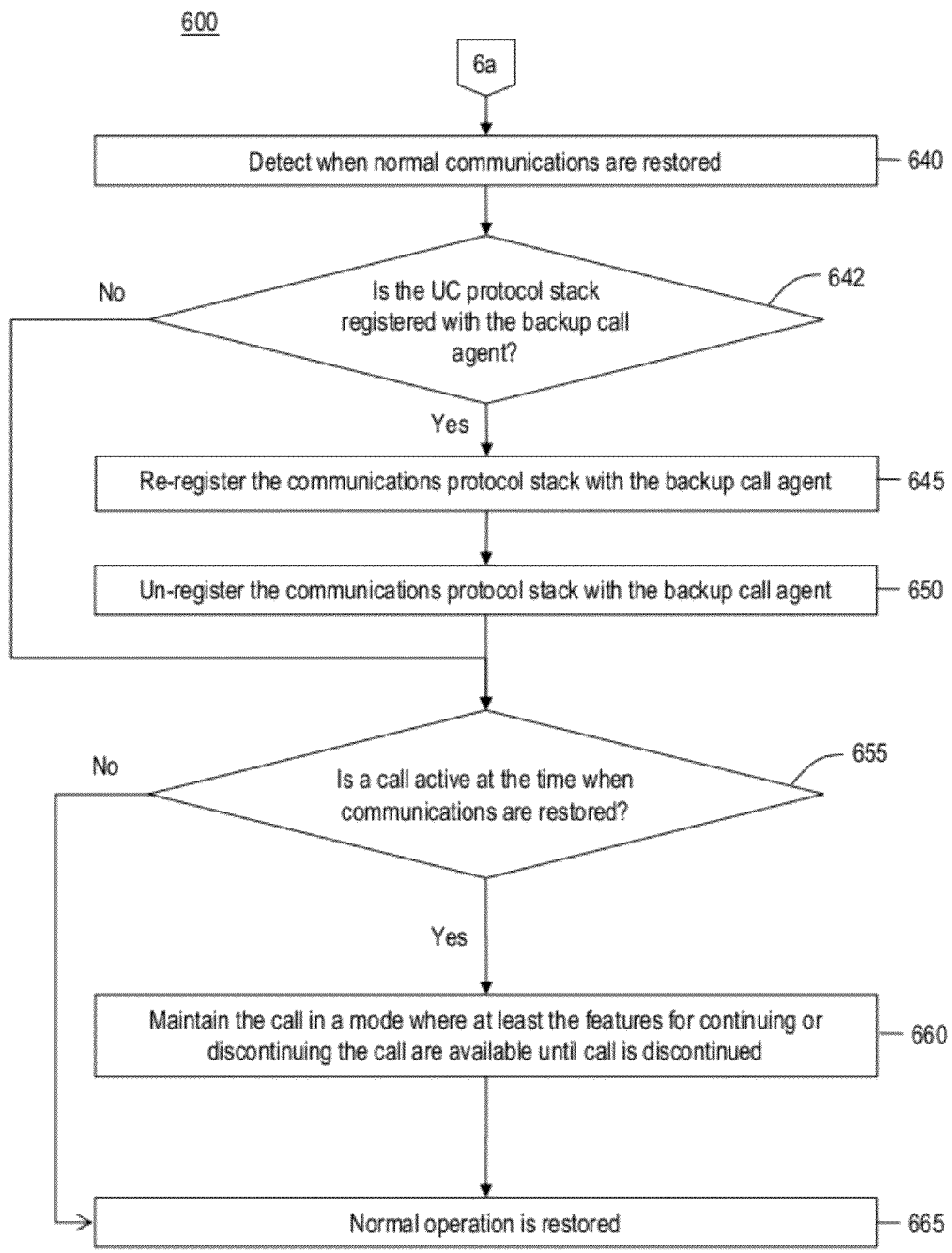

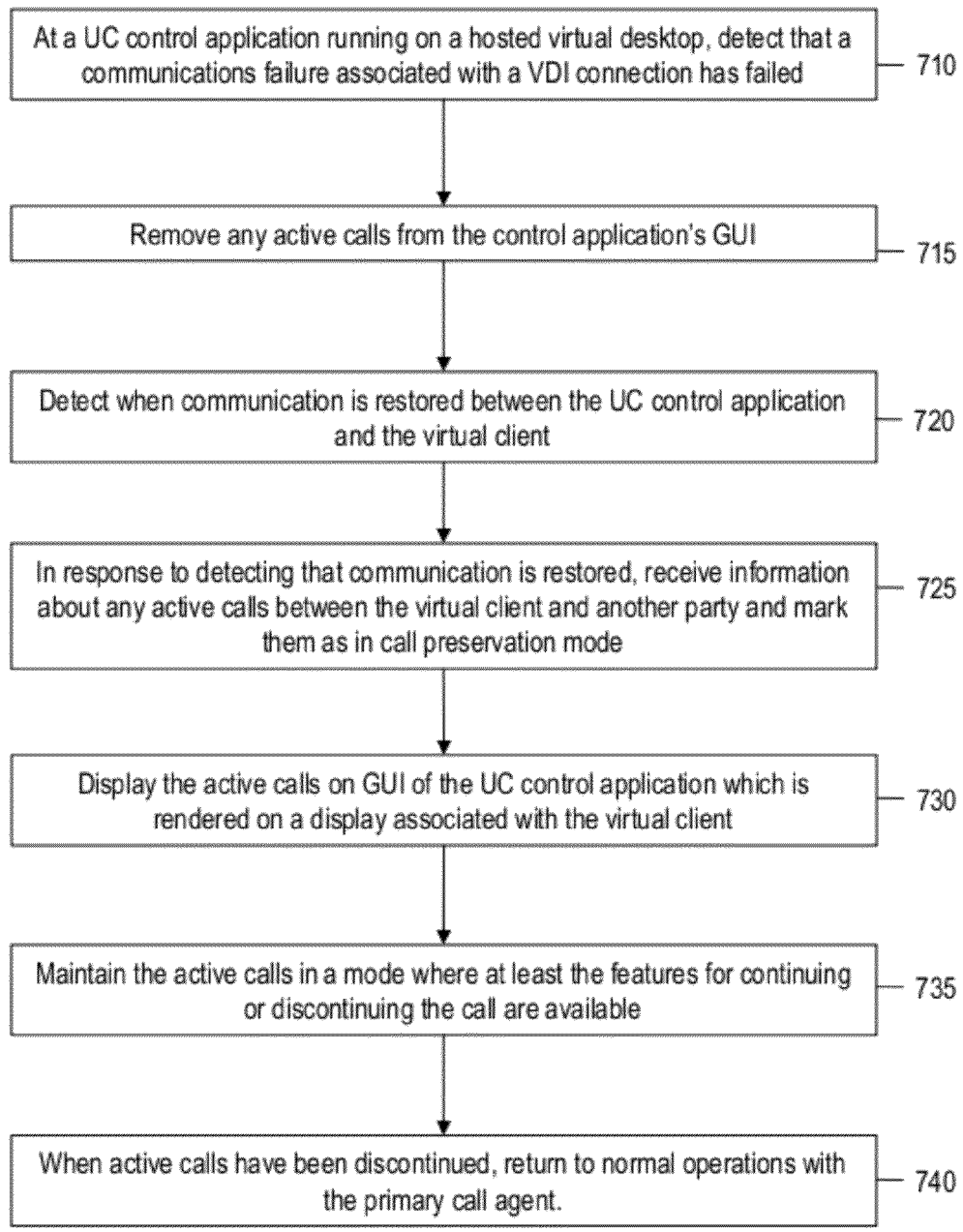

US 8,621,261 B2

SUPPORT FOR VIRTUALIZED UNIFIED COMMUNICATIONS CLIENTS WHEN HOST SERVER CONNECTIVITY IS LOST

TECHNICAL FIELD

The present disclosure generally relates to Unified Communications (UC) and more specifically to maintaining UC connectivity when a virtual client application loses contact with its virtual server.

BACKGROUND

The field of UC is a growing technology that unifies various forms of human communication via a device into a common user experience. UC may integrate real-time communications services such as instant messaging and presence, telephony, and video conferencing with other communications services such as voicemail, email, facsimile, and short messaging services. UC also attempts to achieve media independence. For example, an individual may be in a meeting and receive a call that cannot be accepted during the meeting. Sometime later, a voicemail notification is received for a voicemail which also may not be retrievable by a phone call without disrupting the meeting. UC techniques allow the individual to receive a text version of the voicemail on a handheld device that was converted to text by a voice recognition tool. In this way, UC can increase human productivity by reducing human communications latency.

UC may be virtualized, that is, the UC application may run in a hosted virtual desktop server (HVDS) while the user interface for the application is displayed on a remote virtual desktop thin client (VDTC). Virtualized UC presents a set of unique problems in that the media may be more difficult to virtualize than simple text and graphics, and the loss of the virtual communications session control, e.g., UC control, may leave the end user without the ability even to make and answer simple telephone calls.

BRIEF DESCRIPTION OF THE DRAWINGS

FIG. 1 is an example of a block diagram showing a UC environment in which UC control and connectivity is maintained while a virtual desktop interface (VDI) session between an HVDS and a VDTC is present.

FIG. 2 is an example of a block diagram showing the UC environment at a higher level in which VDI and UC control sessions are maintained while a primary communication path between an HVDS and a VDTC is present.

FIGS. 6a and 6b are examples of flow charts generally depicting operations of the UC control backup process at a VDTC.

FIG. 7 is an example of a flow chart generally depicting operations of the UC control communication failure and restoration process at an HVDS.

DESCRIPTION OF EXAMPLE EMBODIMENTS

Overview

Figure 3A:
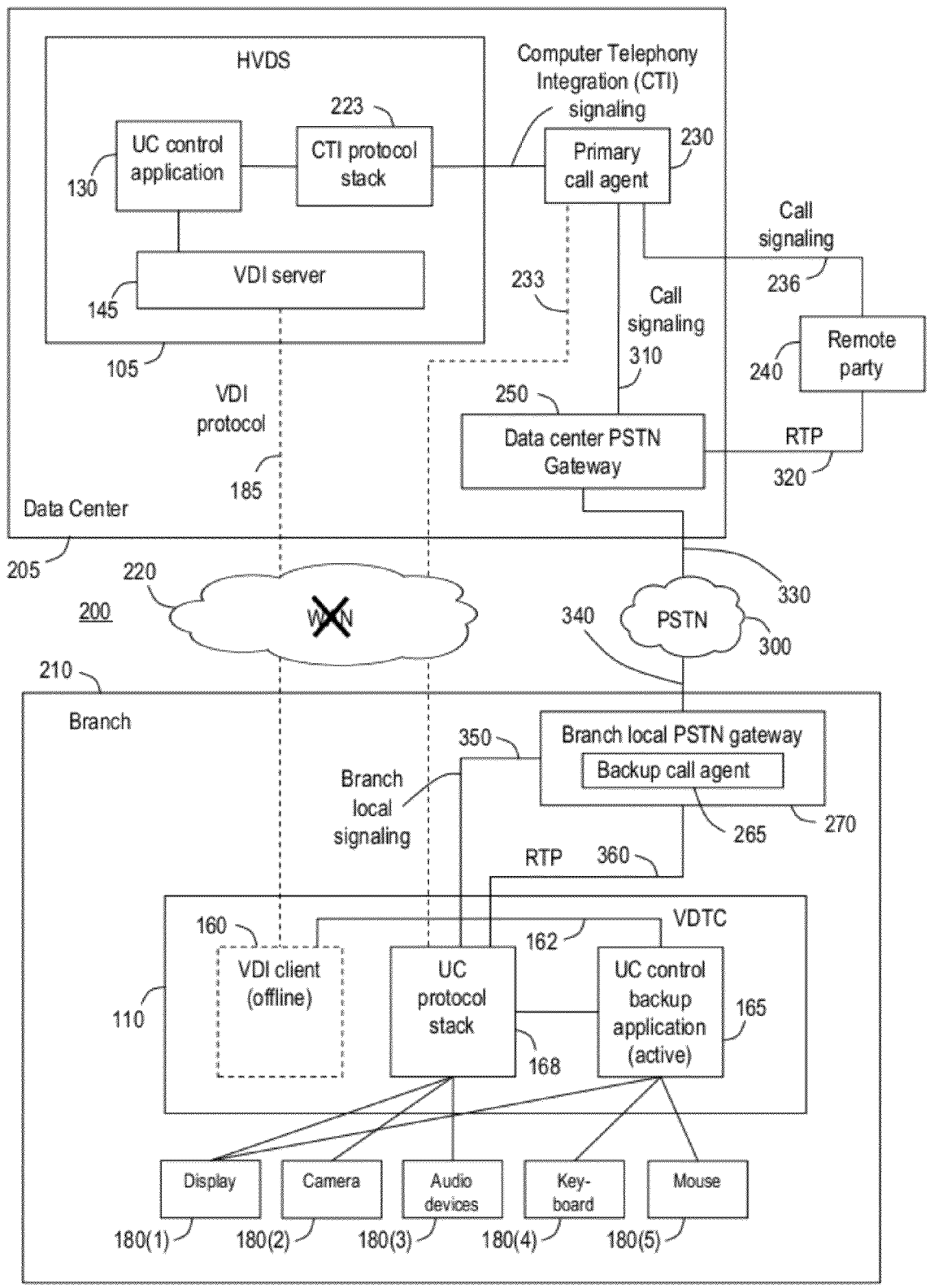
FIG. 3a is an example of a block diagram showing the VDI and UC environment after a primary communication path has failed.

Techniques are provided herein for establishing a Virtual Desktop Interface (VDI) connection at a virtual desktop thin client (VDTC) device, between a VDI client in the VDTC device and a VDI server in a hosted virtual desktop server (HVDS). A unified communications (UC) control connection is established between a UC protocol stack on the VDTC device and a primary call agent, where the UC control connection is configured to allow the UC protocol stack to register with the primary call agent, and to send or receive commands from the primary call agent that are based on signals from a UC control application running on the HVDS. A UC control backup application is started on the virtual desktop thin client device in a standby mode that is configured to switch to an active mode in response to a failure to establish or maintain the UC control connection, or a failure to establish or maintain the VDI connection. When in the active mode, a user interface is launched on the virtual desktop thin client device that is configured to perform UC backup functions.

Techniques are also provided herein for detecting a failure to establish or maintain the VDI connection, and detecting a failure to establish or maintain the UC control connection. In response to detecting either failure, the UC control backup application is switched to the active mode and the user interface is launched.

Example Embodiments

Referring first to FIG. 1, an example of a block diagram is shown for a virtualized desktop environment in which UC control and connectivity are maintained when a primary communication path between an HVDS and a VDTC has failed. The environment has an HVDS 105 and a VDTC 110. The HVDS 105 has a processor 115 and a memory 120. Resident in memory 120 are an operating system and window manager 125, a UC control application 130, and other applications 135. The operating system and window manager 125 interfaces with virtual display, camera, audio, keyboard, and mouse drivers 140(1)-140(5), respectively, which in turn, interface to a virtual desktop interface server (VDI server) 145.

The VDTC 110 has a processor 150 and a memory 155. Resident in memory 155 are a virtual desktop interface client application (VDI client) 160, a UC control backup module or application 165, a UC protocol stack 168, and display, camera, audio, keyboard, and mouse drivers 170(1)-170(5), respectively. Drivers 170(1)-170(5) drive display, camera, audio, keyboard, and mouse input-output (I/O) components 175(1)-175(5), respectively. I/O components 175(1)-175(5) interface with a display, camera, audio, keyboard, and mouse devices 180(1)-180(5), respectively. Virtual drivers 140, VDTC drivers 170, and I/O devices 175 are examples; other sets of drivers and I/O devices may also be included. Thus, VDTC 110 has one or more I/O interfaces configured to support UC sessions. The virtual desktop thin client 110 and the virtual desktop server 105 are coupled by Virtual Desktop Interface (VDI) protocol link 185.

In this example, VDTC 110 is associated with a user. Any applications that the user may be interacting with are hosted by HVDS 105, e.g., as a virtual machine running on a hypervisor, while the user interface, e.g., a graphical user interface (GUI), associated with the application is rendered on VDTC client 110. For example, as the user types on keyboard 180(4) or exercises mouse 180(5), those inputs are translated by VDI client 160 and sent to the VDI server 145 via a VDI link 185, as shown. The VDI server 145, in turn, translates the VDI information into virtual keyboard and mouse inputs by way of virtual keyboard driver 140(4) and virtual mouse driver 140 (5). The virtual keyboard and mouse inputs are fed to UC control application 130 or other applications 135 as if the applications and the I/O devices 180 were running on a single desktop computing device.

The virtual keyboard and mouse inputs are processed by the appropriate application and GUI information is generated by the operating system and window manager 125 for transmission back to virtual desktop thin client 110. The virtual desktop thin client 110 renders the GUI for display to the user on display 180(1). Other I/O, e.g., voice inputs to audio devices 180(3) and image inputs to camera 180(2) may be processed in a similar fashion.

However, audio and video associated with a UC session are not so easily processed by the VDI methods described above. There are several reasons for this. First, use of the VDI protocol to transport audio and video may consume much more network bandwidth, since the audio and video media will need to be transmitted in a relatively uncompressed form over the VDI protocol, rather than using UC voice and video codecs and the Real-time Transport Protocol (RTP) to transport the media directly from the VDTC to a far-end party. Second, redirection of all RTP data to a centralized location where the HVDSs for all VDTCs are present will needlessly concentrate bandwidth at the centralized location. Third, if RTP is coded and decoded on the HVDS, its compute load is much higher than it needs to be, causing scalability problems on the HVDS devices. For this reason, UC audio and video are transported via RTP streams directly to and from another party, e.g., as part of a video teleconference, under the control of UC protocol stack 168. Different network paths may be used for VDI communication, call signaling, and media transmission.

Operations of the video teleconference may be controlled or administered by UC control application 130, e.g., Cisco Systems' Cisco Unified Personal Communicator (CUPC) or similar applications. When a communications failure occurs in the VDI link 185 certain features with respect to the video teleconference are lost, e.g., the user can no longer use the mouse and keyboard inputs to control the UC session, and UC session changes caused by the call agent or remote parties will no longer be rendered on the GUI displayed on display 180 (1). Hence, the user will be unable to originate new UC sessions, "hang up" or end sessions present at the time of failure, or perform a variety of mid-call control operations like hold, resume, mute, unmute, transfer, etc., in a normal fashion. In short, loss of the VDI link therefore implies a near-complete loss of the ability to originate, receive, or control all UC calls.

To assist in maintaining some functionality the UC control backup application 165, in conjunction with the UC protocol stack 168, detects the failure in VDI link 185 and begins to perform backup functionality for the UC control application 130, providing a means to receive user input and render a GUI directly on the VDTC. Operation of the UC control backup application 165 will be described in connection with FIGS. 2, 3a, 3b, 6a, 6b, and 8. Additional operations associated with the UC control application 130 will be described in connection with FIGS. 2, 3a, 3b, 7, and 8. Example devices hosting UC control backup application 165 and UC control application 130 will be described in connection with FIGS. 4 and 5, respectively.

Referring to FIG. 2, a system 200 is shown in which HVDS 105 is stationed in a data center 205 and the VDTC 110 is stationed in a branch office 210. The data center 205 and the branch office 210 communicate through Wide Area Network (WAN) 220. In addition to some of the components from FIG. 1, the data center 205 has a primary call agent 230, and a datacenter Public Switched Telephone Network (PSTN) gateway 250. A remote party 240 is shown with an established UC session, e.g., a teleconference with a party or user associated with VDTC 110. The branch office 210 has a branch local backup call agent 265 associated with a branch local PSTN gateway 270. It is to be appreciated that many other networking components, e.g., routers and switches, may be used in system 200.

The remote party 240 sends and receives RTP voice and video directly with the VDTC 110 over link 243. Remote party 240 may be located anywhere, e.g., within a main office, branch office, or external to both, thereby providing alternative connectivity scenarios. If the remote party's RTP flows through the WAN link 220, a failure will destroy the UC media session. However, if its RTP flows to the VDTC 110 through some other path, for example, over a LAN link in the branch office 210, the RTP session may be preserved during a failure, even though the ability to execute signaling for the UC session between the VDTC and the remote party has been lost over link 233.

The VDI server 145 and VDI client 160 are in normal communication via VDI link 185 by way of WAN 220. The UC control application 130 controls an audio or audio/video call between a user in branch 210 and remote party 240. The UC control application 130 sends third-party call control signals, e.g., Computer Telephony Integration (CTI) signals (as a CTI master) via the CTI protocol stack 223 to primary call agent 230 over link 226 for controlling the media portion of the teleconference, while the application specific information and GUI is communicated between VDI server 145 and VDI client 160 via VDI link 185. The primary call agent 230 sends UC protocol commands based on the CTI signals to UC protocol stack 168 over link 233, e.g., signals associated with call set up, tear down, or mid-call control. Corresponding call signaling is sent to remote party 240 via link 236. Once a teleconference is set up, Internet voice and video may be exchanged between the virtual desktop thin client 110 and the remote party 240 over link 243, as shown.

Throughout this description, the establishment of an association between the UC protocol stack and either primary call agent 230 or backup call agent 265 is referred to as "registration". Such registration can take many forms and should not be construed as requiring any specific form of connection establishment or endpoint identification.

In this example, it can be seen that the VDI client 160 is online and coupled to display, keyboard, and mouse devices 180(1), 180(4), and 180(5), for user interaction with UC control application 130 and the UC protocol stack 168 is coupled to display, camera, audio, devices 180(1)-180(3) for communicating media information, i.e., inbound video for display 180(1), inbound audio for speakers/headphones associated with audio devices 180(3), outbound video from camera 180(2), and outbound voice or audio from microphones or media players associated with audio devices 180(3). The UC control backup application 165 is dormant as indicated by the dashed box and is waiting to detect a communications failure with either or both the primary call agent 230 and UC control application 130, e.g., a failure in WAN 220. In other embodiments, the UC control backup application may be active but performing a limited set of operations that can not be controlled via the CTI or UC control protocols, for example, mute, unmute, and volume control.

UC protocol stack 168 may also be referred to as a UC client software stack, e.g., a Client Services Framework (CSF) stack. In this example, UC control application 130 uses CTI signals via primary call agent 230 to control the UC protocol stack 168 on VDTC 110 via links 226 and 233. In another example, UC control application 130 may send remote procedure calls (RPCs) to UC protocol stack 168, via a pathway that is not shown in the figure. In a non-virtualized environment, when a UC protocol stack loses communication with its UC control application, a locally executing control application would connect to a locally provided redundant call support system, e.g., a Survivable Remote Site Telephony (SRST) system and continue to execute with reduced functionality.

However, when a UC (VDI) thin client is deployed remotely in a branch office environment, it is possible for the connection between the branch and the main office or data center to be lost. In this case, the user of the VDI client loses access to his desktop work environment, the user interface to his UC suite, and any VDI-based UC session control capability. Before a communications failure, the UC control backup application 165 runs in the background, e.g., monitoring the UC protocol stack 168 and VDI client 160 operation via link 162, which in turn is running as a CTI slave, and after a communications failure the UC control backup application 165 assumes that role of the GUI and input mechanism for the user, directly controlling the UC protocol stack 168.

Turning to FIG. 3a, the system 200 from FIG. 2 is shown with a communications failure in WAN 220 as indicated. A PSTN 300 has been added to the figure. In this example, the UC control backup application 165 has detected the failure in UC protocol stack 168 and begins to perform backup functionality for the UC control application 130, i.e., UC control backup application 165 becomes active as indicated by its solid lined box. The control backup application 165 will re-register the UC protocol stack 168 with the backup call agent 265 within branch local PSTN gateway 270. The backup call agent 265 need not be part of the branch local PSTN gateway 270. The UC control backup application 165 performs application specific functionality by handling certain mouse, keyboard, and display functionality that would normally be performed by the HVDS 105, since the VDI client 160 can no longer relay this information due to the failure in the WAN 220. This is indicated by the lines connecting UC control backup application 165 to display 180(1), keyboard 180(4), and mouse 180(5). In other words, virtual desktop thin client 110 has become a "thicker" client by providing increased functionality on the client side. The VDI client 160 goes inactive as indicated by the dashed box and the connections from VDI client 160 to display 180(1), camera 180(2), audio devices 180(3), keyboard 180(4), and mouse 180(5) have been removed.

In this example, remote party 240 is unable to maintain its RTP voice and video media sessions with UC protocol stack 168. Since the backup call agent 265 has no prior knowledge of the previous UC session, the user associated with the VDTC 110 needs to re-establish the UC call with the remote party 240, which in turn causes the connection through the PSTN 300 to be established by the local PSTN gateway 270 and the data center PSTN gateway 250 over links 330 and 340. In data center 205, the data center PSTN gateway 250 picks up any call activity for remote party 240 and provides call signaling, e.g., Session Initiation Protocol (SIP) signaling, via link 310.

In the branch 210, call signaling is maintained via link 350. The branch local PSTN gateway 270 and the data center PSTN gateway 250 may perform any media or protocol conversions that are necessary to maintain media features associated with any calls between remote party 240 and the virtual desktop thin client 110 when transmitted through PSTN 300. In this example, branch local PSTN gateway 270 and data center PSTN gateway 250 provide voice and/or video connectivity between VDTC 110 and remote party 240 over RTP connection 360, PSTN connections 340 and 330, and RTP connection 320, as shown.

When WAN link 220 fails, UC control application 130 is initially unaware of any UC connectivity changes, since the connection between control application 130 and primary call agent 230 remains intact. However, if a UC session is present between remote party 240 and VDTC 110 at the time of the failure, UC control application 130 is informed that a failure has occurred. When VDI server 145 detects the failure of VDI protocol link 185, it signals UC control application 130, which then removes any outstanding calls from its internally rendered GUIs and modifies the CTI protocol stack 223 accordingly.

In this example it has been assumed that a UC session was in progress, VDI link 185 and UC control link 233 were established, and that a failure of links 185 and 233 occurred at the same time due to a failure in WAN 220. However, a UC session need not be in progress, the links 185 and 233 need not be established and failures of link 185 and 233 are independent, i.e., both links do not necessarily traverse WAN 220.

In this regard, techniques are provided herein for establishing a VDI connection 185 at the VDTC device 110, between a VDI client 160 and the VDI server 145 in the HVDS. A UC control connection 233 is also established between the UC protocol stack 168 and the primary call agent 230, where the UC control connection 233 is configured to allow the UC protocol stack 168 to register with the primary call agent 230, and to send or receive commands from the primary call agent 230 that are based on signals from the UC control application 130 and CTI protocol stack 223, which are running on the HVDS 105. The UC control backup application 165 is started on the VDTC device 110 in a standby mode that is configured to switch to an active mode in response to a failure to establish or maintain the UC control connection 233, or a failure to establish or maintain the VDI connection 185. When in the active mode, a user interface is launched on the VDTC device 110 that is configured to perform UC backup functions.

The UC backup control application can detect a failure to establish or maintain the VDI connection 185, and detect a failure to establish or maintain the UC control connection 233. In response to detecting either failure, the UC control backup application 165 is switched to the active mode and the user interface is launched. An example user interface will be described in connection with FIG. 8. The UC control backup application 165 performs UC backup functions via the user interface for the UC control application 130 that are normally provided via the UC control application 130 running on the HVDS when the VDI connection 185 is not available.

The UC protocol stack 168 is registered with the primary call agent 230. When the UC control connection 233 is not available, the UC control backup application 165 is switched to the active mode and the user interface is launched. The UC protocol stack is registered with the secondary or backup call agent 265. The primary call agent 230 automatically unregisters the UC protocol stack 168 when it detects the loss of UC control connection 233. The UC protocol stack 168 is managed by the UC control backup application 165. Management functions for the UC protocol stack 168 may provide via the user interface at least the functions of UC session initiation, creation, and termination, e.g., starting, answering, and ending a UC session.

Techniques are also provided for detecting that the failure of the VDI connection has been repaired. In response to detecting the repair, the UC control backup application 165 is switched to the standby mode and the user interface is terminated. Independently, the failure of the UC control connection 233 has been repaired and detected. In response to detecting the repair, the UC protocol stack 168 is re-registered with the primary call agent. The UC protocol stack 168 is unregistered with the secondary call agent 265. The UC control backup application 165 is switched to the standby mode and the user interface is terminated.

Figure 3B:
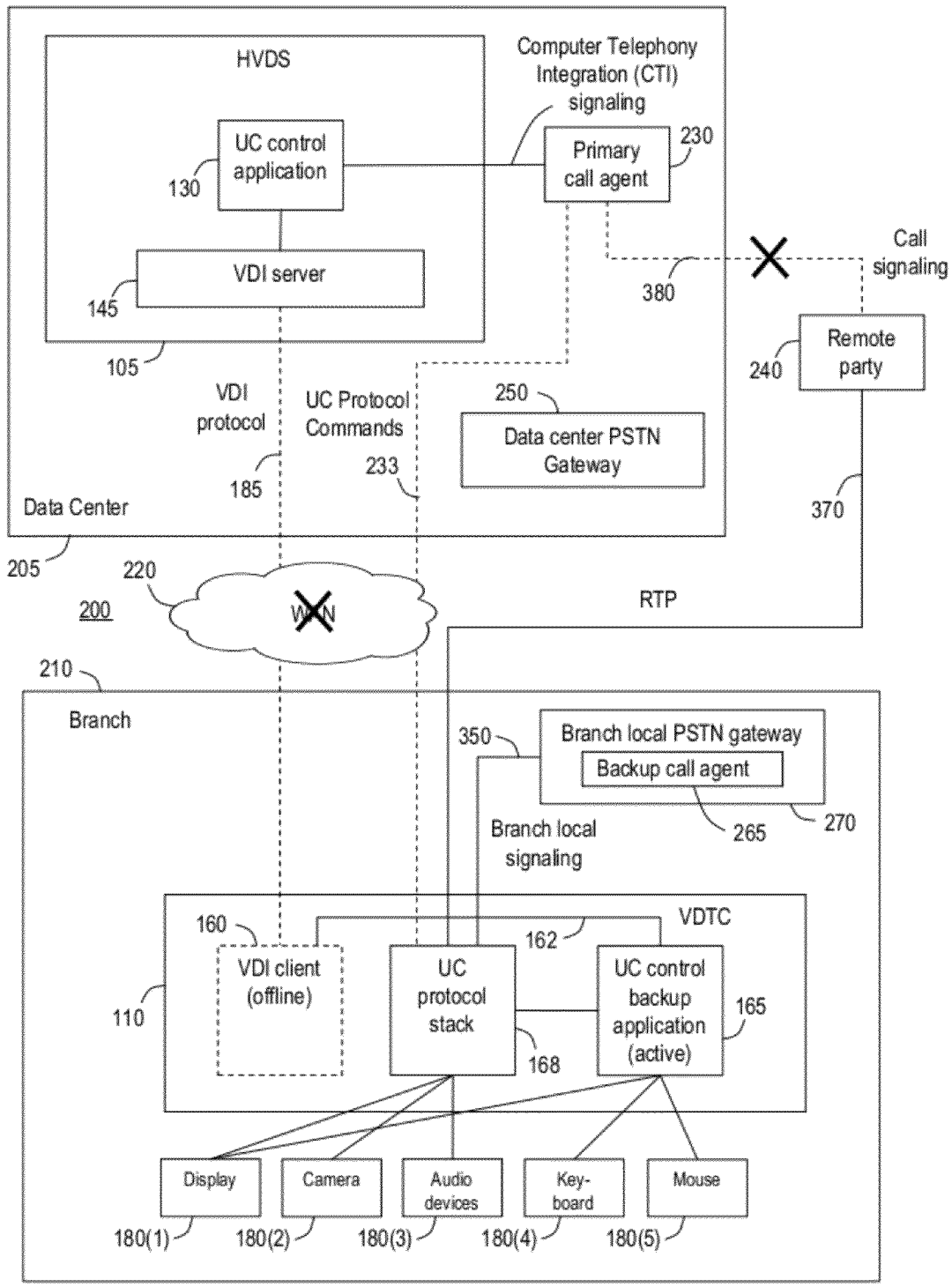
FIG. 3b is an example of a block diagram showing the VDI and UC environment after a primary communication path has failed, but voice and video communication remain intact.

Referring to FIG. 3b, an example block diagram similar to FIG. 3a is shown. However, in this example, the RTP voice and video media path 370 between remote party 240 and VDTC 110 is maintained when the WAN link 220 fails. In this example, even though both the VDI protocol 185 and UC signaling session over link 233 has been interrupted and remote party 240 loses its call signaling path 380, the UC conversation or session carried by the RTP voice and video packets may continue over link 370. However, in this mode no mid-call features can be supported in what may be referred to as a "call preservation mode". The only available feature allows the end user to terminate the RTP session. Once any UC sessions in call preservation mode have terminated, new UC sessions can be initiated via the backup call agent 265.

In another example, VDI protocol 185 and UC control connection 233 may not fail simultaneously. In this example, registration of the UC protocol stack 168 with the backup call agent 265 will occur when the UC control connection 233 fails, and activation of the UC backup control application 165 will occur when either the VDI protocol 185 or UC control connection 233 fails, as described above.

Once a UC session is established between a first party associated with the VDTC device 110 and a second party, e.g., remote party 240, detecting a failure of one or both of the VDI connection and the UC control connection causes the UC control backup application 165 to switch to the active mode and the user interface is launched, as described above. When a failure of the VDI connection 185 is detected, UC media features associated with the UC session are maintained, e.g., voice and video, as well as a feature for discontinuing the UC session via the user interface.

When a failure of the UC control connection 233 is detected, the UC protocol stack 168 is registered with the secondary call agent 265 and the primary call agent 230 unregisters UC protocol stack 168. The UC protocol stack 168 is managed by the UC control backup application 165. The UC session between the first party and the second party is re-established using the secondary call agent 265 and the user interface. Information is exchanged between the VDTC and the HVDS to facilitate the UC control application 130 in resuming normal operations when both the VDI connection 185 and the UC control connection 233 are operational after a failure of either connection.

Figure 4:
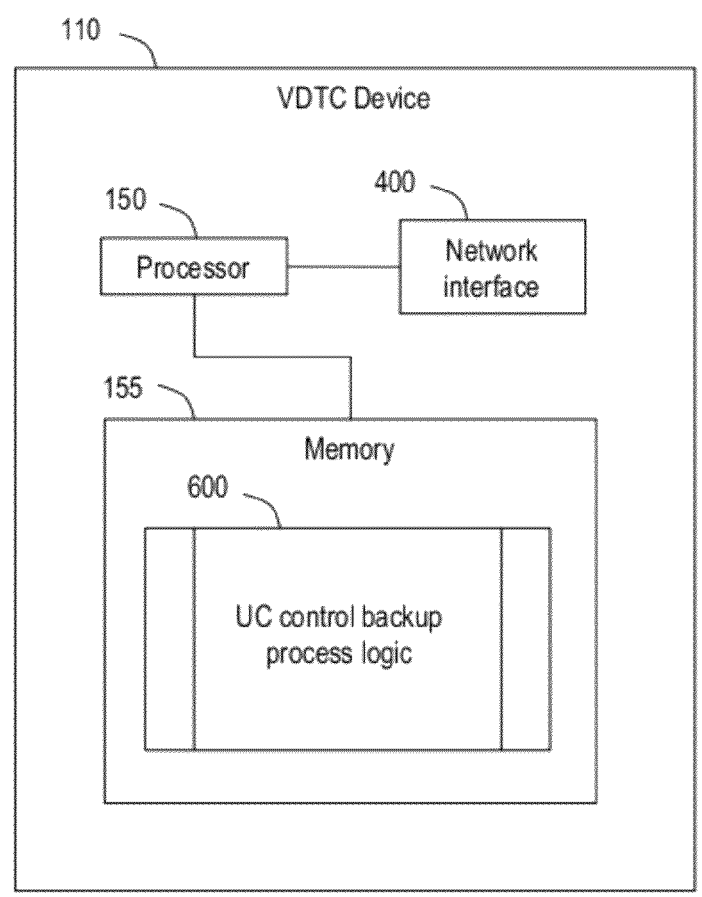
FIG. 4 is an example of a block diagram of a VDTC device that is configured to activate a UC control backup process after a communications failure and de-activate it after a subsequent communications restoration.

Referring to FIG. 4, an example block diagram of a network device, e.g., VDTC device 110, is shown that is configured to provide backup capability to a UC control application. Virtual desktop thin client 110 comprises processor 150, a network interface 400, and a memory 155. Other device components are not shown for simplicity. Resident in the memory 155 is software for UC control backup process logic 600, e.g.,  that may be performed by UC control backup application 165 (FIGS. 3a and 3b). Process logic 600 has been generally described above in connection with FIGS. 1-3 and will be described in additional detail hereinafter in connection with FIGS. 6a and 6b.

The data processing device 150 is, for example, a microprocessor, a microcontroller, systems on a chip (SOCs), or other fixed or programmable logic. The data processing device 150 is also referred to herein simply as a processor. The memory 155 may be any form of random access memory (RAM) or other tangible (non-transitory) memory media or storage device that stores data or instructions used for the techniques described herein. The memory 155 may be separate or part of the processor 150. Instructions for performing the process logic 600 may be stored in the memory 155 for execution by the processor 150 such that when executed by the processor, causes the processor to perform the operations describe herein in connection with FIGS. 6a and 6b. The network interface 400 enables communication throughout system 200 shown in FIGS. 2 and 3.

The functions of the processor 150 may be implemented by a processor or computer readable tangible (non-transitory) medium encoded with instructions or by logic encoded in one or more tangible media (e.g., embedded logic such as an application specific integrated circuit (ASIC), digital signal processor (DSP), a processor, etc.), wherein the memory 155 stores data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic 600 may be implemented with fixed logic or programmable logic (e.g., software or computer instructions executed by a processor or field programmable gate array (FPGA)).

Figure 5:
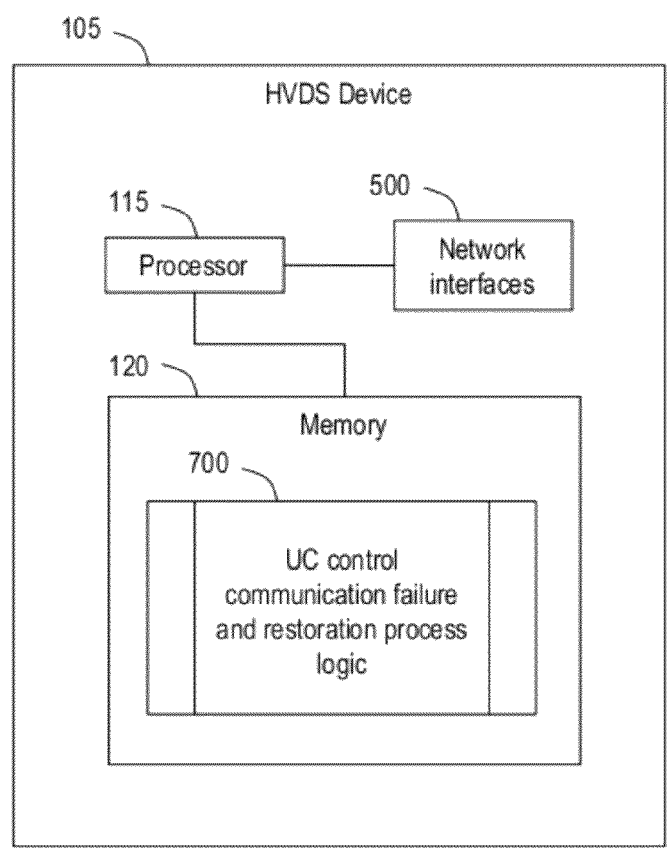
FIG. 5 is an example of a block diagram of a HVDS device that is configured to activate a UC control communication failure and restoration process after a communications failure and subsequent restoration.

Referring to FIG. 5, an example block diagram of relevant portions of a second network device, e.g., virtual desktop server 105, is shown. This device comprises a processor 115, a plurality of network interface units 500, and a memory 120. The plurality of network interface units 500 enable the HVDS 105 to communicate with a plurality of other devices. The processor 115, the network interface units 500, and memory 120 may be configured to operate as described in connection with FIG. 2 for virtual desktop thin client 110. The device shown in FIG. 5 is configured to perform UC control communication failure and restoration process logic 700. The memory 120 stores instructions for the UC control communication failure and restoration process logic 700. Briefly, the UC control communication failure and restoration process logic 700 readies HVDS 105 to return to normal operations when communication is restored. The details of process logic 700 will be described in connection with FIG. 7. It should be understood that any of the devices in system 200 may be configured with a similar hardware or software configuration as devices 105 and 110.

Referring to FIGS. 6a and 6b, and with reference to FIG. 3a, the UC control backup process logic 600 will now be described. At 610, at a thin client device, e.g., VDTC 110, a communication failure is detected that is associated with either a UC control session between the VDTC and a primary call agent, e.g., primary call agent 230, or between the VDI session between the VDTC and the HVDS. The failure may be on a VDI pathway, e.g., VDI link 185, on a pathway associated with signals from the primary call agent, e.g., UC control connection 233, or both.

In one example, CUPC is running in desk phone control mode, using, for example, a CTI protocol to assert third-party control over UC protocol stack 168, on the VDTC 110. Consequently, the user interface for CUPC is being rendered on the VDTC by the VDI client 160 on the VDTC 110 via display 180(1). In normal operation, the UC control backup application 165 that is attached to this CSF stack is dormant and does not generate a user interface to be rendered on the VDI endpoint. When the VDI link between the branch and the data center is severed, the VDI thin client is no longer receiving user interface information from the host virtual machine, and the user interface freezes. However, calls are still active in the CSF "softphone stack" on the VDI endpoint.

According to the techniques described herein, at step 610, the UC control backup application 165 will detect when the CSF stack can no longer communicate with the call manager, e.g., the CUPC application, as described above. At 612, it is determined if the UC control session failed over UC control link 233. If the UC control session failed, then at 615, in response to detecting the failure, a communications protocol stack associated with the communications session is re-registered with a backup call agent. In one example, UC protocol stack 168 is re-registered with the branch local backup call agent 265 in PSTN gateway 270. The branch local backup call agent 265 and PSTN gateway 270 may be an SRST type device. After, the UC protocol stack 168 is re-registered or if the failure was not in the UC control session, at 620, the UC control backup application 165 will create a window, e.g., a GUI, on the VDTC device to allow the user to interact with any calls that were active at the time of failure, or any future calls that are initiated during the communication outage, i.e., during the period through which the failure persists.

At the time of failure, there may be active UC calls or sessions. At 625, it is determined if any calls associated with the communications session are active, and if so, whether their associated media persist after the failure. If calls are not active at the time of the failure, the process continues at 635. If calls were active at the time of failure and managed to retain their media flow even though their call signaling is no longer available, at 630, these calls are preserved such that the user associated with the VDTC may continue to converse with the remote party 240 in a call preservation mode. In one example, the UC control backup application 165 user interface allows the preservation mode calls to be continued or terminated, i.e., hung up. Once preservation mode has been established for any calls that were active at the time of the failure, control proceeds to step 635.

At 635, the backup control application performs predetermined backup functions for the communications control application that are normally associated with communications between the virtual server and the virtual client device. By way of example, the UC control backup application 165 may perform application specific functionality by handling certain mouse, keyboard, and display functionality that would normally be performed by the virtual desktop server 105 for rendering on the virtual desktop client 110, e.g., via the backup application user interface, and to execute a set of UC session control features, for example, call origination and termination, hold, resume, mute, unmute, call transfer, etc.

The process continues in FIG. 6b. At 640, the backup application detects when normal communications are restored. At 642, it is determined if the UC protocol stack is registered with the backup call agent. If not, the process continues at 655. At 645, in response to detecting the restoration, the communications protocol stack is re-registered with the primary call agent, and at 650, the communications protocol stack is unregistered with the backup call agent. At 655, it is determined if any calls are active at the time when communications are restored. If calls are not active, the process continues at 665. If calls are active, at 660, the calls are maintained in a call preservation mode where any active calls are kept available, as described above. At 665, normal operation is restored. When connectivity with the hosted VM is re-established, the UC control backup application 165 detects the restored connectivity and drops back into background (dormant) mode and the VDI client 165 comes back online as shown in FIG. 2.

Referring to FIG. 7, and with reference to FIG. 3a, the UC control communication failure and restoration process logic on the HVDS 700 will now be described. At 710, at a UC control application 130 running on HVDS 105, a communications failure associated with a VDI communications session 185 is detected, At 715, the UC control application 130 will remove any active calls from the GUI, ensuring that call signaling destroyed by the WAN failure is erased from the GUI before VDI connectivity is re-established. As part of removing the calls from the GUI, the UC control application 130 may force the removal of the UC sessions from the primary call agent 230.

At 720, detection is made when communication is restored between the UC control application and the virtual client, e.g., when VDI link 185 is restored. At 725, in response to detecting the restoration, information is received, either from the primary call agent 230 or from the UC protocol stack 168, about any calls between the virtual client and another party that were active or ongoing at the time when communication is restored.

At 730, the active calls are displayed on the user interface of the UC control application, e.g., UC control application 130, which is in turn rendered on the user interface of the VDI client 160. At 735, any active or ongoing calls are maintained in a mode, e.g., a preservation mode, where at least the features of continuing or discontinuing the calls are available. At 740, when the UC control application discovers that any ongoing calls have been discontinued, via either the primary call agent 230 or the UC protocol stack 168, it returns to normal operations with the primary call agent.

Figure 8:
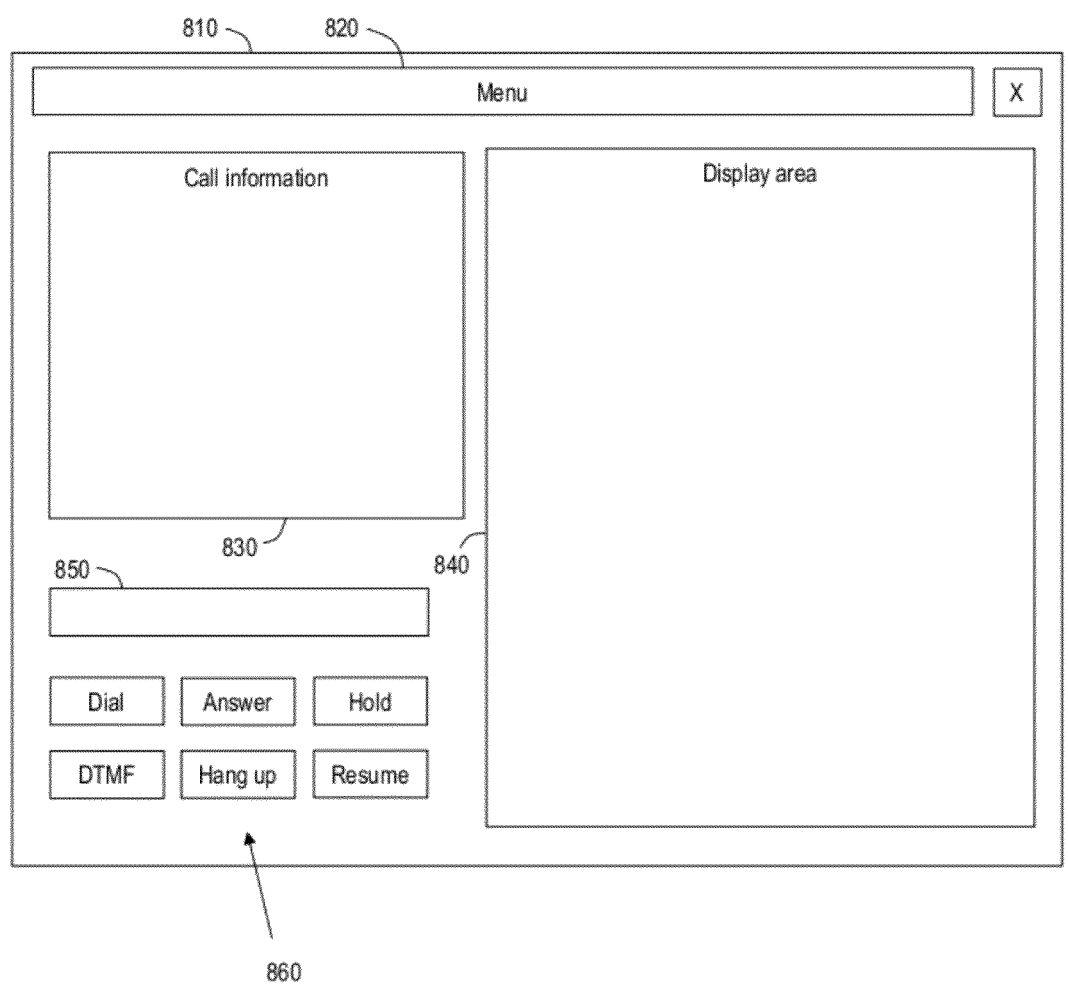
FIG. 8 is an example of a user interface associated with a UC control backup application.

FIG. 8 example depicts an example GUI that is associated with the UC control backup application, e.g., UC control backup application 165. In this example GUI 810 has a menu 820, a call information area 830, a display area 850, a text entry box 850, and a plurality of UC call or session control buttons. The menu 810 may have typical GUI style menu options, e.g., to save call information like duration and phone number, or to record the conversation. The call information area 830 displays any configured call or other information, e.g., current call duration. The display area 840 is optional and may display video associated with the call, e.g., the remote party or any shared media.

Text entry box 850 is used to enter dialing information. For example, text entry box 850 may allow the entry of a phone, contact name, address, or any other information used to initiate a UC session. The call control buttons include a button such as Dial in order to dial the party entered in the text entry box 850 or Dual Tone Multi-Frequency (DTMF) in order to enter commands on a telephone style keypad. The remaining call control buttons shown at 860 have functions that are self-explanatory.

In another example, the VDTC may be equipped with a password protected screen saver. The screen saver may activate during a call or when a user is away causing a screen lock. Even when normal connectivity is established, a user interface may be expressed by the UC control backup application so that calls may be answered or emergency calls may be placed via the UC protocol stack 168, bypassing the screen lock. For example, if there is an emergency and in a panic the user forgets his or her password in order to unlock the display screen, the user interface may provide a mechanism to place emergency phone calls, e.g., E911 calls.

In sum, techniques have been described herein for establishing a Virtual Desktop Interface (VDI) connection at a virtual desktop thin client (VDTC) device, between a VDI client in the VDTC device and a VDI server in a hosted virtual desktop server (HVDS). A unified communications (UC) control connection is established between a UC protocol stack on the VDTC device and a primary call agent, where the UC control connection is configured to allow the UC protocol stack to register with the primary call agent, and to send or receive commands from the primary call agent that are based on signals from a UC control application running on the HVDS. A UC control backup application is started on the virtual desktop thin client device in a standby mode that is configured to switch to an active mode in response to a failure to establish or maintain the UC control connection, or a failure to establish or maintain the VDI connection. When in the active mode, a user interface is launched on the virtual desktop thin client device that is configured to perform UC backup functions.

Techniques are also provided herein for detecting at a communications control application running on a virtual server device a communications failure associated with a communications session between the communications control application and a virtual client device. The communications session is controlled by the communications control application and communications session commands are managed by a primary call agent based on signals from the communications control application. In response to detecting the failure, any calls associated with a primary call agent are removed.

When VDI thin client software loses connectivity with its host, the backup application activates a foreground window that allows interaction with the user to control calls directly until host connectivity is restored. This solution can provide much higher UC availability than traditional methods for branch offices that wish to use VDI desktops as their mission-critical UC delivery vehicle by preserving UC functionality even when the link between the branch and the main office is down.

The above description is by way of example only.

What is claimed is:

1. A method comprising:
   at a virtual desktop thin client device, establishing a Virtual Desktop Interface (VDI) connection between a VDI client in the virtual desktop thin client device and a VDI server in a hosted virtual desktop server;
   establishing a unified communications (UC) control connection between a UC protocol stack on the virtual desktop thin client device and a primary call agent, wherein the UC control connection is configured to allow the UC protocol stack to register with the primary call agent, and to send or receive commands from the primary call agent that are based on signals from a UC control application running on the hosted virtual desktop server;
   starting a UC control backup application on the virtual desktop thin client device in a standby mode that is configured to switch to an active mode in response to a failure to establish or maintain the UC control connection, or a failure to establish or maintain the VDI connection; and
   when the UC control backup application is in the active mode, launching a user interface on the virtual desktop thin client device configured to perform UC backup functions.

2. The method of claim 1, further comprising:
   detecting a failure to establish or maintain the VDI connection;
   in response to detecting the failure, switching the UC control backup application to the active mode;
   launching the user interface; and
   performing UC backup functions with the UC control backup application via the user interface for the UC control application that are normally provided via the UC control application running on the hosted virtual desktop server.

3. The method of claim 2, further comprising:
   detecting that the failure of the VDI connection has been repaired;
   in response to detecting the repair, switching the UC control backup application to the standby mode; and
   terminating the user interface.

4. The method of claim 1, further comprising registering the UC protocol stack with the primary call agent.

5. The method of claim 4, further comprising:
   detecting a failure to establish or maintain the UC control connection;
   in response to detecting the failure, switching the UC control backup application to the active mode;
   launching the user interface;
   registering the UC protocol stack with a secondary call agent; and
   managing the UC protocol stack with the UC control backup application, wherein managing comprises managing functions for the UC protocol stack that comprise at least the functions of starting, answering, and ending a UC session via the user interface.

6. The method of claim 5, further comprising:
   detecting that the failure of the UC control connection has been repaired;
   in response to detecting the repair, re-registering the UC protocol stack with the primary call agent;
   unregistering the UC protocol stack with the secondary call agent;
   switching the UC control backup application to the standby mode; and
   terminating the user interface.

7. The method of claim 4, further comprising:
   establishing a UC session between a first party associated with the virtual desktop thin client device and a second party;
   detecting a failure of one or both of the VDI connection and the UC control connection;
   in response to detecting either failure, switching the UC control backup application to the active mode; and
   launching the user interface.

8. The method of claim 7, wherein in response to detecting a failure of the VDI connection, further comprising:
   maintaining UC media features associated with the UC session; and
   maintaining a feature for discontinuing the UC session via the user interface.

9. The method of claim 7, wherein in response to detecting a failure of the UC control connection, further comprising:
   registering the UC protocol stack with a secondary call agent;
   managing the UC protocol stack, wherein managing comprises managing functions for the UC protocol stack that comprise at least the functions of starting, answering, and ending a UC session via the user interface; and re-establishing the UC session between the first party and the second party using the secondary call agent and the user interface.

10. The method of claim 7, further comprising exchanging information between the virtual desktop thin client and the hosted virtual desktop server to facilitate the UC control application to resume normal operations when both the VDI connection and the UC control connection are operational after a failure of either connection.

11. An apparatus comprising:
a network interface device configured to send and receive information associated with a unified communication (UC) sessions and management thereof between the apparatus comprising a virtual desktop thin client device and another party;
one or more input-output interfaces configured to support UC sessions; and
a processor configured to:
establish a Virtual Desktop Interface (VDI) connection between a VDI client in the virtual desktop thin client device and a VDI server in a hosted virtual desktop server;
establish a unified communications (UC) control connection between a UC protocol stack on the virtual desktop thin client device and a primary call agent, wherein the UC control connection is configured to allow the UC protocol stack to register with the primary call agent, and to send or receive commands from the primary call agent that are based on signals from a UC control application running on the hosted virtual desktop server;
start a UC control backup application in a standby mode that is configured to switch to an active mode in response to a failure to establish or maintain the UC control connection, or a failure to establish or maintain the VDI connection; and
when in the active mode, launch a user interface on the virtual desktop thin client device configured to perform UC backup functions.

12. The apparatus of claim 11, wherein the processor is further configured to:
detect a failure to establish or maintain the VDI connection;
in response to detecting the failure, switching the UC control backup application to the active mode;
launch the user interface; and
perform UC backup functions for the UC control application that are normally provided via the UC control application running on the hosted virtual desktop server.

13. The apparatus of claim 11, wherein the processor is further configured to:
register the UC protocol stack with the primary call agent;
detect a failure to establish or maintain the UC control connection;
in response to detecting the failure, switch the UC control backup application to the active mode;
launch the user interface;
register the UC protocol stack with a secondary call agent;
manage the UC protocol stack, wherein the processor is configured to manage functions for the UC protocol stack that comprise at least the functions of starting, answering, and ending a UC session via the user interface.

14. The apparatus of claim 13, wherein the processor is further configured to:

establish a UC session between a first party associated with the virtual desktop thin client device and a second party;
detect a failure of one or both of the VDI connection or the UC control connection;
in response to detecting either failure, switch the UC control backup application to the active mode; and
launch the user interface.

15. The apparatus of claim 14, wherein in response to detecting a failure of the VDI connection, the processor is further configured to:
maintain UC media features associated with the UC session; and
maintain a feature for discontinuing the UC session via the user interface.

16. The apparatus of claim 14, wherein in response to detecting a failure of the UC control connection, the processor is further configured to:
register the UC protocol stack with a secondary call agent;
manage the UC protocol stack;
re-establish the UC session between the first party and the second party using the secondary call agent and the user interface.

17. One or more non-transitory computer readable media encoded with instructions that, when executed by a processor, cause the processor to:
establish a Virtual Desktop Interface (VDI) connection between a VDI client in the virtual desktop thin client device and a VDI server in a hosted virtual desktop server;
establish a unified communications (UC) control connection between a UC protocol stack on the virtual desktop thin client device and a primary call agent, wherein the UC control connection is configured to allow the UC protocol stack to register with the primary call agent, and to send or receive commands from the primary call agent that are based on signals from a UC control application running on the hosted virtual desktop server;
start a UC control backup application in a standby mode that is configured to switch to an active mode in response to a failure to establish or maintain the UC control connection, or a failure to establish or maintain the VDI connection; and
when in the active mode, launch a user interface configured to perform UC backup functions.

18. The non-transitory computer readable media of claim 17, further comprising instructions that when executed cause the processor to:
detect a failure to establish or maintain the VDI connection;
in response to detecting the failure, switching the UC control backup application to the active mode;
launch the user interface; and
perform UC backup functions for the UC control application that are normally provided via the UC control application running on the hosted virtual desktop server.

19. The non-transitory computer readable media of claim 17, further comprising instructions that when executed cause the processor to:
register the UC protocol stack with the primary call agent;
detect a failure to establish or maintain the UC control connection;
in response to detecting the failure, switch the UC control backup application to the active mode;
launch the user interface;
register the UC protocol stack with a secondary call agent; and
manage the UC protocol stack, wherein the instructions that manage comprise instructions that when executed cause the processor to manage functions for the UC protocol stack that comprise at least the functions of starting, answering, and ending a UC session via the user interface.

20. The non-transitory computer readable media of claim 19, further comprising instructions that when executed cause the processor to:
  establish a UC session between a first party associated with the virtual desktop thin client device and a second party;
  detect a failure of one or both of the VDI connection or the UC control connection;
  in response to detecting either failure, switch the UC control backup application to the active mode; and
  launch the user interface.

21. The non-transitory computer readable media of claim 20, further comprising instructions that when executed cause the processor to:
  maintain UC media features associated with the UC session; and
  maintain a feature for discontinuing the UC session via the user interface.

22. The non-transitory computer readable media of claim 20, further comprising instructions that when executed cause the processor to:
  register the UC protocol stack with a secondary call agent;
  manage the UC protocol stack; and
  re-establish the UC session between the first party and the second party using the secondary call agent and the user interface.

* * * * *